United States Patent [19]

Knudsen et al.

[11] Patent Number: 5,273,699
[45] Date of Patent: Dec. 28, 1993

[54] MOISTURE-RESISTANT ALUMINUM NITRIDE POWDER AND METHODS OF MAKING AND USING

[75] Inventors: Arne K. Knudsen; Theresa A. Guiton, both of Midland, Mich.; Laura L. Beecroft, Beavercreek, Ohio

[73] Assignee: The Dow Chemical Company, Midland, Mich.

[21] Appl. No.: 837,293

[22] Filed: Feb. 14, 1992

[51] Int. Cl.⁵ .............................................. C04B 35/58
[52] U.S. Cl. .............................. 264/56; 252/315.01; 501/98
[58] Field of Search ........................... 264/56; 501/98; 252/315.01

[56] References Cited

U.S. PATENT DOCUMENTS

| | | | |
|---|---|---|---|
| 4,857,246 | 8/1989 | Bolt | 264/65 |
| 4,950,435 | 8/1990 | Taniguchi | 501/98 |
| 4,988,646 | 1/1991 | Mukherjee | 501/98 |
| 5,063,183 | 11/1991 | Taniguchi | 501/98 |

FOREIGN PATENT DOCUMENTS

WO90/06906  6/1990  World Int. Prop. O. .

OTHER PUBLICATIONS

*Ceramics and Glasses,* vol. 4, pp. 116–118, Engineered Materials Handbook.
Derwent Abstract 136387/20–Sep. 1986.
Derwent Abstract 303600/43–Mar. 1986.
Derwent Abstract 107436–Jun. 1983.
Derwent Abstract 297766/48–Apr. 1983.
Derwent Abstract 277347/45–Nov. 1984.

*Primary Examiner*—James Derrington

[57] ABSTRACT

Moisture-resistant aluminum nitride powder which is treated with an yttrium-containing compound. The method of treating the aluminum nitride compound includes (a) thoroughly mixing a slurry containing aluminum nitride powder, an yttrium-containing compound, and a solvent for the yttrium-containing compound in the absence of any surfactant and (b) removing the solvent from the slurry. The moisture-resistant aluminum nitride powder may be used in aqueous formulations for making ceramic articles.

11 Claims, No Drawings

MOISTURE-RESISTANT ALUMINUM NITRIDE POWDER AND METHODS OF MAKING AND USING

TECHNICAL FIELD

This invention relates generally to treated aluminum nitride powder, the method of treating aluminum nitride powder, and methods of using such powder.

BACKGROUND OF THE INVENTION

Ceramic materials are used today in many applications which call for durable, tough, and heat-resistant materials. In making ceramic articles, a ceramic composite powder is often made by first wet mixing ceramic powder, such as aluminum nitride, ceramic composite components, such as binders, lubricants, sintering aids, and other processing aids in a solvent.

Traditionally, when aluminum nitride powder is used as the ceramic powder, the wet mixing is performed using alcohol or some other non-aqueous liquid as the solvent to aid in mixing. Water is generally not a suitable solvent for wet mixing with aluminum nitride powder because aluminum nitride is highly sensitive to hydrolysis. The sensitivity of aluminum nitride to hydrolysis is so great that when aluminum nitride powder and water are mixed, a violent reaction may occur.

Due to environmental concerns, water would be an ideal solvent for wet mixing aluminum nitride powder. If water were to be used as the solvent, no precautions would need to be taken to avoid exposure to the solvent during wet mixing operations. Additionally, containment of the solvent and precautions to avoid the dangers of flammable liquids during and after mixing would not be necessary with water as it would be with other solvents.

A method of enabling the wet mixing of aluminum nitride powder in water is taught by PCT Patent Application WO 90/06906, published Jun. 28, 1990. The PCT Patent Application discloses a method of preparing an inorganic nitride or carbide particle having deposited thereon a substantially uniform surface layer coating of a metal hydroxide or metal oxide. The method includes (i) placing nitride or carbide particles into a solution comprising water and a surfactant which reacts with the nitride or carbide particles at a faster rate than the water, (ii) adding thereto an aqueous solution which comprises ions of a metal which will form the metal hydroxide or oxide, and (iii) increasing the pH of the solution of the metal and the nitride or carbide particles to deposit the metal hydroxide on the surface of the nitride or carbide particles. The patent application describes that the nitride may be aluminum nitride and the metal hydroxide or oxide may be generated from salts such as yttrium nitrate.

However, the method disclosed in the PCT Patent Application is not ideal. The method of the PCT Patent Application employs an amount of the metal compound which is higher than that found necessary by the present invention. The higher amount of metal compound could be an unnecessary additional cost to making the ceramics. In addition, the PCT Patent Application uses water or predominantly water as the solvent during the treatment step, which may not be preferred due to the possibility of hydrolysis of the aluminum nitride powder. A further disadvantage of the method of the PCT Patent Application is that a surfactant is used to coat the aluminum nitride powders, possibly leaving an undesired impurity in the ceramic. Some of the surfactants mentioned consist of zirconium and aluminum compounds. The addition of zirconium and aluminum oxides to aluminum nitride powders is known to negatively affect the thermal conductivity of parts sintered from the powders.

Water-sensitivity is the root of another problem with using aluminum nitride powder for making ceramic materials. The problem arises when, during storage of the aluminum nitride powder, moisture attacks the powder forming aluminum hydroxide on the surface of the powder. In addition, ammonia by-product is released.

It is therefore a primary object of the present invention to provide moisture-resistant aluminum nitride powder which may be used to make ceramic articles without sacrificing physical properties. It is also an object of the present invention to provide simple methods of making aluminum nitride powder moisture-resistant.

It is another object of the present invention to provide a method of making aluminum nitride powder resistant to water to the extent that the aluminum nitride powder may be processed in water without significant hydrolysis.

It is yet another object of the present invention to provide methods of using the moisture-resistant aluminum nitride powders of this invention.

SUMMARY OF THE INVENTION

In accordance with a preferred embodiment of the invention, these and other objects and advantages are addressed as follows.

In one embodiment of the invention, a moisture-resistant aluminum nitride powder is disclosed which is rendered moisture-resistant due to treatment with an yttrium-containing compound. The yttrium-containing compound is present in an amount from about 0.1 to about 10 weight percent, calculated as yttrium oxide, of the aluminum nitride.

In another embodiment of the invention, a method of preparing an aqueous slip containing moisture-resistant aluminum nitride powder is disclosed. The method includes (a) thoroughly mixing a slurry containing aluminum nitride powder, an yttrium-containing compound, and a solvent for the yttrium-containing compound in the absence of any surfactant, (b) removing the solvent from the slurry to form moisture-resistant aluminum nitride powder treated with the yttrium-containing compound, and (c) dispersing the moisture-resistant aluminum nitride powder in an aqueous medium. In this method, the moisture-resistant aluminum nitride powder may be treated with the yttrium-containing compound in an amount from about 0.1 to about 10 weight percent, calculated as yttrium oxide, of the aluminum nitride powder.

The aqueous slip described immediately above may be used to make ceramic articles. In the method of making such ceramic articles, the moisture-resistant aluminum nitride powder and ceramic composite components are mixed in an aqueous medium to form a slip, the aqueous medium is removed from the slip to form composite powder, and the composite powder is shaped as desired and sintered to form the sintered aluminum nitride ceramic article.

DETAILED DESCRIPTION OF THE INVENTION

One embodiment of the present invention entails a moisture-resistant aluminum nitride powder which is rendered moisture-resistant due to treatment with an yttrium-containing compound. The yttrium-containing compound is present in an amount of from about 0.1 to about 10 weight percent, calculated as yttrium oxide, of the aluminum nitride. It is believed that a substantial amount of the yttrium-containing compound coats the aluminum nitride powder. The yttrium-containing compound may be yttrium nitrate, yttrium sulfate, yttrium carbonate, yttrium alkoxides such as yttrium ethoxide and yttrium isopropoxide, and mixtures thereof. After treatment of the aluminum nitride powder, these yttrium-containing compounds may be converted to yttrium oxide.

The method of treating aluminum nitride powder with the yttrium-containing compound includes (a) thoroughly mixing a slurry containing aluminum nitride powder, an yttrium-containing compound, and a solvent for the yttrium-containing compound in the absence of any surfactant and (b) removing the solvent from the slurry to form moisture-resistant aluminum nitride powder treated with the yttrium-containing compound.

The yttrium-containing compounds must be substantially soluble in the solvent employed. Once the aluminum nitride powders are treated with the yttrium-containing compounds, the yttrium-containing compounds may be oxidized to form the sintering aid, yttria.

The moisture-resistant aluminum nitride powder is treated with the yttrium-containing compound in an amount of from about 0.1 to about 10 weight percent, calculated as yttrium oxide, of the aluminum nitride powder. In some instances, a low amount of the yttrium treatment is desired and the yttrium-containing compound is employed in an amount of from about 0.1 to about 0.4 weight percent, calculated as yttrium oxide, of the aluminum nitride powder. When a low amount of the yttrium-containing compound is used, it allows sintering aids other than yttria to be used in the formulation while keeping the total amount of sintering aid low.

Suitable solvents which may be employed in the method of treating the aluminum nitride powder include polar organic solvents and their mixtures. Suitable polar organic solvents include methanol, ethanol, and isopropanol. Non-aqueous solvents are usually preferred over aqueous solvents, as they offer less chance of hydrolysis of the aluminum nitride powder. The amount of solvent employed in the slurry is generally enough to facilitate mixing of the ingredients.

During the treatment procedure, the slurry preferably consists essentially of solvent, the yttrium-containing compound, and the aluminum nitride powder. In other words, additives such as binders, lubricants, and plasticizers are not added to the slurry.

The solvent, the yttrium-containing compound, and the aluminum nitride powder may be mixed together in any order. Preferably, the slurry is blended until a uniform coating is achieved on external surfaces of the aluminum nitride powder.

Removing of the solvent from the slurry, i.e., by drying the treated aluminum nitride powder, may be completed by conventional devices, including rotary evaporators, vacuum ovens, spray driers, or evaporating dishes. There is generally no need to grind or break up the dry treated powder. Once the moisture-resistant aluminum nitride powder has been prepared, it may be dispersed in an aqueous medium to be milled with ceramic composite components, thereby forming a slip. It has been found that the moisture-resistant aluminum nitride powders of this invention can be submerged and agitated in water for at least 46 hours, and sometimes up to 250 hours, before significant hydrolysis begins. Once significant hydrolysis begins, the reaction is not violent, as it would be with untreated aluminum nitride powder.

As mentioned, the moisture-resistant aluminum nitride powder may be dispersed in an aqueous medium with ceramic composite components. Ceramic composite components may include binders, lubricants, sintering aids, dispersants, plasticizers, and other processing aids. Examples of binders which may be used include polyethylene glycols and polyethylene oxides. The binder may be added alone or in combination with a solvent. Preferably, the binder is employed in an amount sufficient to provide the greenware article formed from the composite powder with sufficient strength to retain its shape during normal handling and processing. This amount is typically from about 1 to about 20 percent by weight based on the weight of the aluminum nitride powder, and is more typically from about 2 to about 10 percent by weight based on the weight of the aluminum nitride powder.

In formulating slips with the treated aluminum nitride powders of this invention, lubricants may be used to aid in processing. Suitable lubricants are oleic acid, stearic acid, and mineral oil. These lubricants may be employed in amounts ranging from about 0.1 to about 2 weight percent based on the weight of the aluminum nitride powder.

Suitable sintering aids which may be added to the slip to make the composite powder include calcium oxides, yttria, and other rare earth and alkaline earth metal oxides and halides. The sintering aids are typically employed in amounts from about 0.5 to about 10 weight percent based on the weight of the aluminum nitride powder.

Example dispersants to be added may include menhaden fish oil or an ammonium polyelectrolyte sold under the name "DARVAN", a trademark of R. T. Vanderbilt Co., Norwalk, Conn. Dispersants are added to slips in an amount sufficient to facilitate milling and aid in maintaining a high solids to liquid ratio. If a dispersant is employed, it is preferably in an amount which is less than about 1 weight percent, and more preferably, from about 0.1 to about 1 weight percent based on the weight of the aluminum nitride powder.

Plasticizers may also be used to lower the glass transition temperature of the binder so that the binder can flow at low applied pressures and low temperatures. Example plasticizers include propylene glycol, dipropylene glycol, tripropylene glycol, glycerin and the like. If a plasticizer is employed it is usually employed in an amount which is from about 1 to about 20 percent by weight based on the weight of the aluminum nitride powder, and more usually from about 2 to about 10 percent by weight based on the weight of the aluminum nitride powder.

Typically, the slip has a "solids" content of from about 20 to about 80 weight percent, and, more typically from about 40 to about 70 weight percent. "Solids" refer to the aluminum nitride powder and any ceramic composite components employed. Correspondingly, the aqueous medium is present in the slip in an amount of from about 80 to about 20 weight percent, and, more typically, from about 30 to about 60 weight percent, wherein the weight percents of the solids and the aqueous medium total 100 percent.

The process of milling the slip acts to mix the ingredients and to reduce or eliminate agglomerates. Methods of milling suitable for the invention include ball milling, sonication, and high shear mixing. Milling is typically performed by ball milling, which is rolling the slip in a closed container containing milling media such as aluminum nitride pellets. Milling is generally carried out for about two to 24 hours. The milled slip may be cast as a tape, injection molded, slip cast, or compacted to form a greenware article which may then be sintered. If the slip is to be compacted to form a greenware article, the slip is first dried to a powder. Any method for drying which produces substantially dry powder from the slip may be used. Preferably, the drying is accomplished by spray drying or pan drying, with or without the application of heat. To remove agglomerates from the slip, the slip may be filtered prior to drying.

Compacting the powder into greenware articles is done by any suitable means, such as dry pressing or isostatic pressing. The greenware articles will typically have the desired shape of the final product and sufficient density and strength to substantially retain their shape during handling and further processing.

Once the slip has been cast, molded, or compacted into an article, the article is usually heated to remove or "burn-out" the organic components, such as the binder, lubricant, dispersant, plasticizer and any other organic processing aid. The burn-out operation may be done in an inert gas (e.g., $N_2$, $H_2/N_2$, or $Ar$) atmosphere or air atmosphere. It is desirable to burn-out the organic components at a temperature of from about 380° C. to about 550° C.

After burning out the organic additives, the article is then generally sintered at temperatures of from about 1600°–1950°. The sintering may be done in an inert atmosphere, such as nitrogen, or in a reducing atmosphere, such as hydrogen or a hydrogen-nitrogen mix.

This invention has an advantage in that the yttrium-containing compound, acting as a sintering aid, is very well dispersed in the composite powder, generally optimizing the effectiveness of the sintering aid. A well-distributed sintering aid may also provide improved microstructural uniformity which may, in turn, result in improved mechanical, thermal, and electrical properties as well as provide a uniform surface chemistry, facilitating subsequent metallization of the sintered ceramic.

Thus, there are provided in accordance with the present invention, (1) a moisture-resistant aluminum nitride powder that may be used to make ceramic articles without sacrificing physical properties, (2) simple methods of making moisture-resistant aluminum nitride powder that may be processed in water without significant hydrolysis, and (3) methods of using the moisture-resistant aluminum nitride powders of this invention.

The following examples are illustrative only and should not be construed as limiting the invention which is properly delineated in the appended claims.

EXAMPLES

Example 1

8.5 g $Y(NO_3)_3 \times 5H_2O$ were dissolved in 700 ml ethanol to form a solution. Then 500 g of an aluminum nitride powder having a surface area of 3.5 $m^2/g$ were added slowly to the solution while vigorously mixing. The amount of yttrium nitrate used relative to the amount of aluminum nitride powder resulted in the yttrium being present at a level of 0.5 weight percent, calculated as $Y_2O_3$, of the aluminum nitride. After the nitrate, ethanol, and nitride powder slurry were mixed under high shear for approximately 1 hour, the slurry was rotary evaporated under vacuum to dryness and further dried and calcined for 16 hours at 120° C. in a vacuum oven to form a moisture-resistant powder.

The moisture-resistant aluminum nitride powder was tested for resistance to hydrolysis by mixing the powder in water. Specifically, 8 g powder were mixed in 60 ml deionized water. The pH of the powder-water mixture was measured over time, while the mixture was continuously stirred. The pH rose from 6.5 to a stable pH of less than 7.2 which was maintained over 8 days, at which point an extremely gradual rise in pH was noted.

Comparatively, untreated aluminum nitride powder was tested for resistance to hydrolysis by mixing it in water as described with the treated powder. The pH of the powder-water mixture rose from 6.5 to over 10, and, within 24 hours, a violent boiling reaction between the powder and the water occurred.

Example 2

Using ethanol as the solvent, aluminum nitride powder was treated according to the invention with yttrium ethoxide at a 0.5 weight percent level, calculated as yttrium oxide. The treated powders did not experience a violent reaction in water, as would untreated powders, providing evidence that yttrium ethoxide is a suitable treating compound for the invention.

Example 3

Using ethanol as the solvent, aluminum nitride powder was treated according to the invention with yttrium sulfate at a 0.5 weight percent level, calculated as yttrium oxide. The treated powders did not experience a violent reaction in water, as would untreated powders, providing evidence that yttrium sulfate is a suitable treating compound for the invention.

Example 4

Aluminum nitride powder was treated according to the invention with yttrium nitrate at a level of 0.5 weight percent as yttrium oxide using ethanol as the solvent. 92 g of the treated aluminum nitride were mixed with the 1 g propylene glycol, 3 g glycerin, 0.23 g of an ammonium polyelectrolyte sold under the name "DARVAN C", a trademark of R. T. Vanderbilt Co., Norwalk, Conn., 2.76 g yttrium oxide, and 60 ml deionized water. The mixture was ball milled in aluminum nitride media for 21 hours in a closed container. 4 g of methyl cellulose sold under the name "METHOCEL", a trademark of The Dow Chemical Company, Midland, Mich., dispersed in approximately 80 ml water were added to the ball-milled mixture. About 25 more milliliters water were added to the mixture to facilitate rinsing during transfer of the mixture from one container to another. The mixture was then hand stirred and centrifuged to remove bubbles. The mixture was tape cast to a 0.125 cm thickness and dried under forced air. The dried thickness was about 0.015 cm thick. The dried cast material was then exposed to 500° C. for one hour to burn-out the organic components. The oxygen content of the resulting burned-out material was 2.88 weight percent. The burned-out material was then sintered at 1860° C. for one hour. After sintering the burned-out material, the oxygen content was 2.5 weight percent.

This example demonstrated that the treated aluminum nitride powder can successfully be processed in water-based formulations for many hours in a closed container.

While our invention has been described in terms of a specific embodiment, it will be appreciated that other embodiments could readily be adapted by one skilled in the art. Accordingly, the scope of our invention is to be limited only by the following claims.

What is claimed is:

1. A method of preparing an aqueous slip containing moisture-resistant aluminum nitride powder, comprising:
   (a) thoroughly mixing a slurry consisting essentially of aluminum nitride, powder, an yttrium-containing compound, and a solvent for the yttrium-containing compound in the absence of any surfactant,
   (b) removing the solvent from the slurry to form dry moisture-resistant aluminum nitride powder uniformly coated with the yttrium-containing compound, and
   (c) dispersing the dry moisture-resistant aluminum nitride powder and ceramic composite components in an aqueous medium wherein the aqueous medium is employed in an amount from about 20 to about 80 weight percent and the dry moisture-resistant aluminum nitride powder and the ceramic composite components are employed in an amount from about 20 to about 80 weight percent wherein the weight percents of the aqueous medium and the dry moisture-resistant aluminum nitride powder and the ceramic composite components total 100 percent.

2. The method of claim 1, wherein the moisture-resistant aluminum nitride powder is treated with the yttrium-containing compound in an amount from about 0.1 to about 10 weight percent as yttrium oxide.

3. The method of claim 1, wherein the moisture-resistant aluminum nitride powder is treated with the yttrium-containing compound in an amount from about 0.1 to about 0.4 weight percent as yttrium oxide.

4. The method of claim 1, wherein the yttrium-containing compound is selected from the group consisting of yttrium nitrate, yttrium sulfate, yttrium carbonate, yttrium alkoxide, and mixtures thereof.

5. The method of claim 1, wherein the solvent is selected from the group consisting of polar organic liquids and mixtures thereof.

6. A method of preparing an aqueous slip containing moisture-resistant aluminum nitride powder, comprising:
   (a) thoroughly mixing a slurry consisting essentially of aluminum nitride powder, an yttrium-containing compound selected from the group consisting of yttrium nitrate, yttrium sulfate, yttrium carbonate, yttrium alkoxide, and mixtures thereof, and a solvent for the yttrium-containing compound in the absence of any surfactant, the yttrium-containing compound employed in an amount from about 0.1 to about 10 weight percent of the aluminum nitride powder as yttrium oxide, the solvent selected from the group consisting of polar organic liquids and mixtures thereof,
   (b) removing the solvent from the slurry to form dry moisture-resistant aluminum nitride powder uniformly coated with the yttrium-containing compound, and
   (c) dispersing the dry moisture-resistant aluminum nitride powder and ceramic composite components in an aqueous medium wherein the aqueous medium is employed in an amount from about 20 to about 80 weight percent and the dry moisture-resistant aluminum nitride powder and the ceramic composite components are employed in an amount from about 20 to about 80 weight percent wherein the weight percents of the aqueous medium and the dry moisture-resistant aluminum nitride powder and the ceramic composite components total 100 percent.

7. A method of preparing a sintered aluminum nitride ceramic article, comprising:
   (a) thoroughly mixing a slurry consisting essentially of aluminum nitride powder, an yttrium-containing compound, and a solvent for the yttrium-containing compound in the absence of any surfactant,
   (b) removing the solvent from the slurry to form dry moisture-resistant aluminum nitride powder uniformly coated with the yttrium-containing compound,
   (c) dispersing the dry moisture-resistant aluminum nitride powder and ceramic composite components in an aqueous medium to form a slip wherein the aqueous medium is employed in an amount from about 20 to about 80 weight percent and the dry moisture-resistant aluminum nitride powder and the ceramic composite components are employed in an amount from about 20 to about 80 weight percent wherein the weight percents of the aqueous medium and the dry moisture-resistant aluminum nitride powder and the ceramic composite components total 100 percent,
   (d) removing the aqueous medium from the slip to form composite powder,
   (e) shaping the composite powder, and
   (f) sintering the shaped composite powder to form the sintered aluminum nitride ceramic article.

8. The method of claim 7, wherein the moisture-resistant aluminum nitride powder is treated with the yttrium-containing compound in an amount from about 0.1 to about 10 weight percent as yttrium oxide.

9. The method of claim 7, wherein the moisture-resistant aluminum nitride powder is treated with the yttrium-containing compound in an amount from about 0.1 to about 0.4 weight percent as yttrium oxide.

10. The method of claim 7, wherein the yttrium-containing compound is selected from the group consisting of yttrium nitrate, yttrium sulfate, yttrium carbonate, yttrium alkoxide, and mixtures thereof.

11. The method of claim 7, wherein the solvent is selected from the group consisting of polar organic liquids and mixtures thereof.

* * * * *